United States Patent [19]
Wille et al.

[11] Patent Number: 5,883,902
[45] Date of Patent: Mar. 16, 1999

[54] TIME SLOT INTERCHANGER AND DIGITAL COMMUNICATIONS TERMINAL FOR ISDN D-CHANNEL ASSEMBLY

[75] Inventors: David G. Wille, Plano, Tex.; Kay B. Magleby, Coolin, Id.

[73] Assignee: Alcatel USA Sourcing, L.P., Plano, Tex.

[21] Appl. No.: 759,187

[22] Filed: Dec. 4, 1996

[51] Int. Cl.$^6$ .................................................. H04J 3/12
[52] U.S. Cl. .......................................... 370/524; 370/376
[58] Field of Search .................................. 370/351, 401, 370/524, 530, 264, 265, 378, 381, 376, 375, 377, 379, 476, 522; 379/201, 207, 419

[56] References Cited

U.S. PATENT DOCUMENTS

| | | | |
|---|---|---|---|
| 5,157,656 | 10/1992 | Turduic et al. | 370/379 |
| 5,640,387 | 6/1997 | Takahashi et al. | 370/376 |

OTHER PUBLICATIONS

M.J.M. Forbes et al, Integrated Access: The Achievement of A Vision, IEEE, and 2081–2086, 1991.

Arvidson et al, A Generic Digital Switch Interface(TR–303) For Local Access, IEEE, 2087–2091, 1991.

Klim et al, Flexibility and Quality in the Access Network, IEEE, 1864–1868.

Bellcore Information, Bellcore: GR–303 Integrated Access Platforms, Mar. 3, 1998.

*Primary Examiner*—Ajit Patel
*Assistant Examiner*—Chiho Andrew Lee
*Attorney, Agent, or Firm*—Baker & Botts, L.L.P.

[57] ABSTRACT

The invention comprises a time slot interchanger and method for multiplexing ISDN D-channel signals into multiplexed signals in a digital communications terminal. One method comprises receiving a frame of communication signals wherein some of the communication signals represent ISDN D-channel signals wherein each ISDN D-channel signal is represented by a first number of data bits and a second number of other bits. A copy of the frame of communication signals is stored in each of a first, second, third and fourth memory during a first frame period. At least some of the stored communication signals are retrieved from the first, second, third, and fourth memories during a second frame period. Multiplexed signals are then assembled wherein at least one multiplexed signal comprises a multiplexed combination of the data bits of ISDN D-channel signals retrieved from at least two of the first, second, third, and fourth memories.

15 Claims, 3 Drawing Sheets

FIG. 3 ated with DSC Communications
TIME SLOT INTERCHANGER AND DIGITAL COMMUNICATIONS TERMINAL FOR ISDN D-CHANNEL ASSEMBLY

BACKGROUND OF THE INVENTION

Bellcore has developed a series of requirements for telecommunications equipment manufacturers to follow when interfacing a digital loop carrier with a class V central office switch. These requirements are collected in Bellcore document TR-303.

One of the optional requirements of TR-303 concerns assembly of a plurality of Integrated Services Digital Network (ISDN) D-channel signals into a single DS0 signal. This option of TR-303 now requires that up to four ISDN D-channel signals be multiplexed together to form a single DS0 signal for transport from a digital loop carrier to a class V central office switch. The regional bell operating companies now require that this option be made available.

An ISDN signal comprises two B-channel and one D-channel signal. Each B-channel signal comprises an 8-bit signal while the D-channel signal comprises a 2-bit signal. Because the 8-bit DS0 signal has been the traditional base unit of transport for the telephone system, ISDN D-channel signals often consume an entire 8-bit DS0 signal. Transporting individual D-channel signals in a DS0 signal wastes three-fourths of the bandwidth for that particular DS0.

The optional requirement of TR-303 discussed above seeks to utilize bandwidth more efficiently. In accordance with TR-303, one to four ISDN D-channel signals may be multiplexed together and carried in a single DS0 signal between the digital loop carrier and the central office class V switch. This TR-303 requirement reduces wasted bandwidth between a digital loop carrier and a class V central office switch, particularly where a large number of ISDN lines are connected to the digital loop carrier.

SUMMARY OF THE INVENTION

One aspect of the invention is a method and apparatus for multiplexing ISDN D-channel signals into multiplexed signals. Another aspect of the invention is a digital communications terminal that assembles ISDN D-channel signals in accordance with the method of the invention. The method comprises receiving a frame of communication signals wherein some of the communication signals represent ISDN D-channel signals wherein each ISDN D-channel signal is represented by a first number of data bits and a second number of other bits. A copy of the frame of communication signals is stored in each of a first, second, third, and fourth memories during a first frame period. At least some of the stored communication signals are retrieved from the first, second, third, and fourth memories during a second frame period. Multiplexed signals are assembled wherein at least one multiplexed signal comprises a multiplexed combination of the data bits of ISDN D-channel signals retrieved from at least two of the first, second, third, and fourth memories.

The invention has several important technical advantages. The invention allows a digital loop carrier to meet an optional requirement of TR-303 for ISDN D-channel assembly. Assembly may be accomplished using the time slot interchanger of the digital loop carrier. The invention may also be used in any type of digital communications terminal. Utilization of a time slot interchanger for D-channel assembly makes efficient use of a digital communications terminal's hardware because the time slot interchanger may also be used in its traditional role as a time slot interchanger. The invention allows the manufacturer of an existing digital loop carrier to easily redesign its time slot interchanger in a time and cost efficient manner in order to meet the requirements of TR-303. The invention achieves multiplexing of D-channel signals without adding additional frames of time delay to the D-channel signals.

BRIEF DESCRIPTION OF THE DRAWINGS

For a more complete understanding of the present invention and the advantages thereof, reference is now made to the following descriptions, taken in conjunction with the accompanying drawings in which.

DETAILED DESCRIPTION OF THE INVENTION

Figure 1:
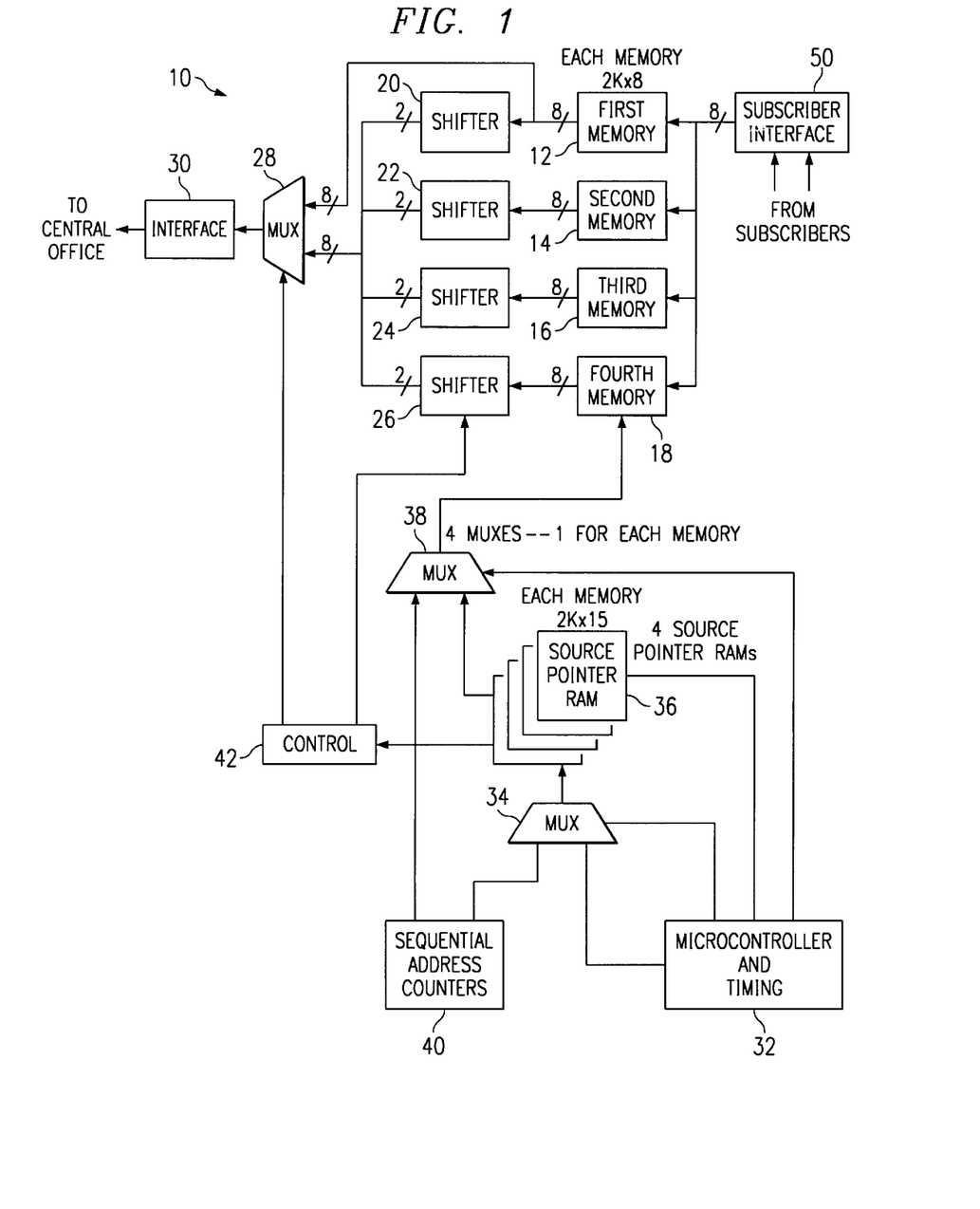
FIG. 1 illustrates a block diagram of a first embodiment of the time slot interchanger portion of a digital communications terminal constructed in accordance with the invention.
Figure 2:
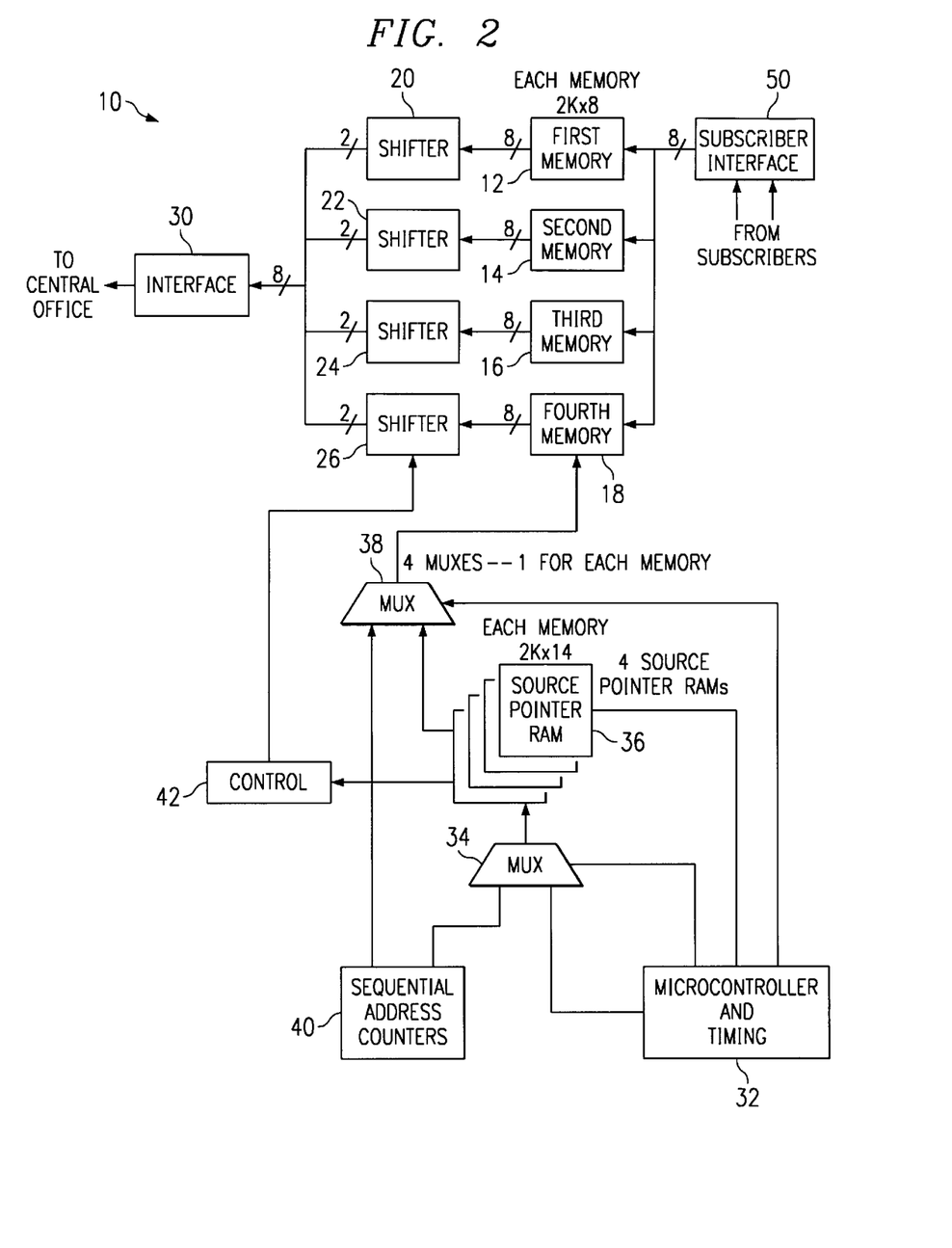
FIG. 2 illustrates a block diagram of a second embodiment of the time slot interchanger portion of a digital communications terminal constructed in accordance with the invention.
Figure 3:
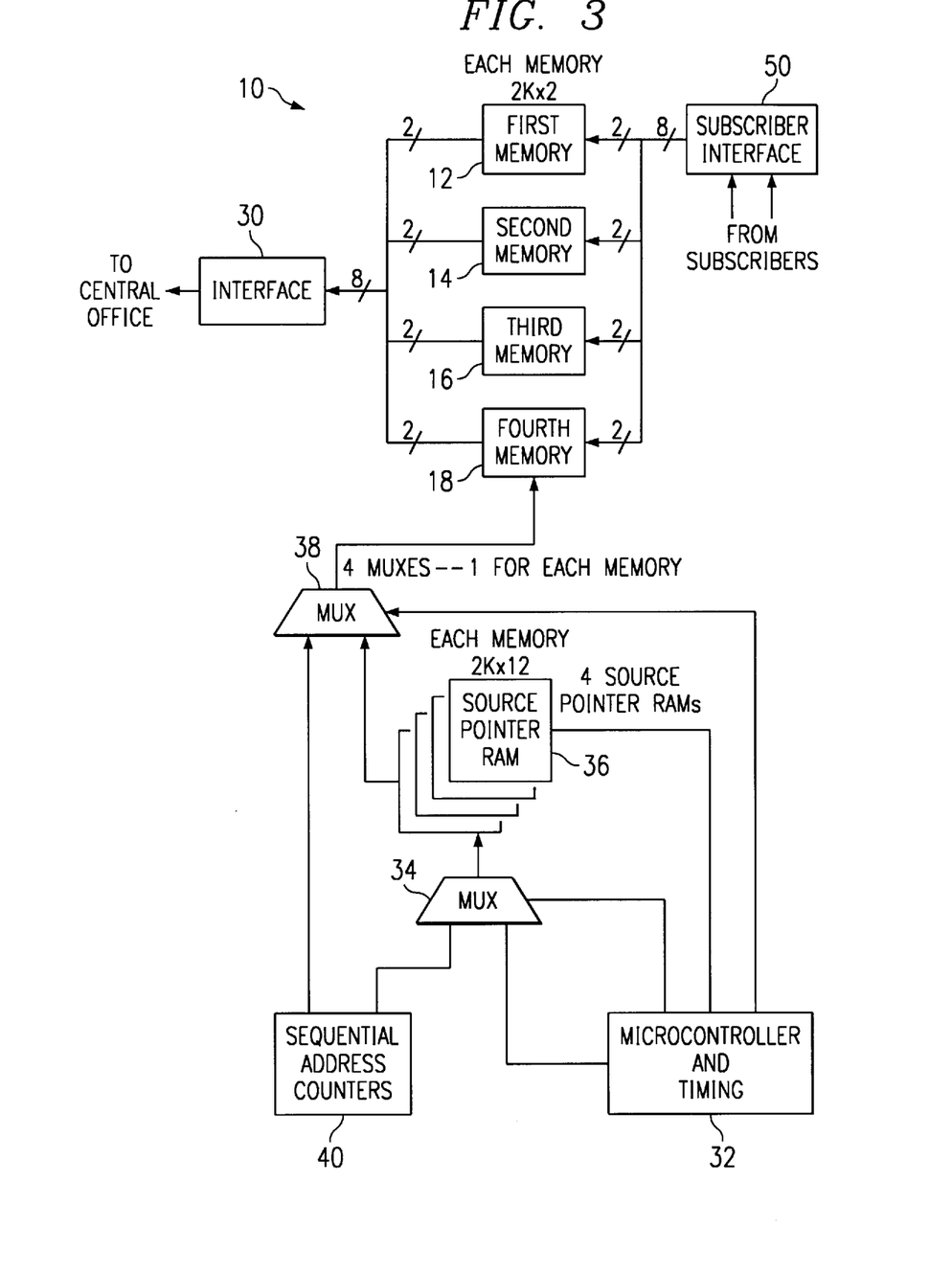
FIG. 3 illustrates a block diagram of a third embodiment of the time slot interchanger portion of a digital communications terminal constructed in accordance with the invention.

The preferred embodiment of the present invention and its advantages are best understood by referring to FIGS. 1 through 3 of the drawings, like numerals being used for like and corresponding parts of the various drawings.

FIG. 1 illustrates an embodiment of a time slot interchanger 10 that may be used to multiplex ISDN D-channel signals in accordance with the invention. For purposes of this description, the terms "D-channel" and "1/4 DS0" are used interchangeably and refer to the 2-bit portion of an ISDN signal. Time slot interchanger 10 is capable of performing a time slot interchange function on a plurality of signals received from a subscriber interface and sent to a central office interface. Although this function will not be described in detail, it should be understood that time slot interchanger 10 may perform any function performed by an existing time slot interchanger as well as performing the functions of the invention. For example, time slot interchanger 10 may employ the power conservation techniques disclosed in U.S. Pat. No. 5,260,937 issued to Thomas R. Eames and Lac Trinh and assigned to DSC Communications Corporation, which is hereby incorporated by reference as if fully set forth herein. Although this example of the invention performs assembly of D-channel signals between subscribers and a central office, the invention could be used anywhere in a communications network.

Time slot interchanger 10 comprises first time slot interchanger memory 12, second time slot interchanger memory 14, third time slot memory interchanger 16, fourth time slot interchanger memory 18, shifters 20, 22, 24, & 26, multiplexer 28 and interface 30. First, second, third, and fourth time slot interchanger memories 12, 14, 16, & 18, in this example, are 2K by 8 memories which may be used for interchanging over 2,000 DS0 communication signals. Time slot interchanger memories 12, 14, 16, & 18 receive signals from a subscriber interface (not explicitly shown). In this embodiment, DS0s are written into time slot interchanger memories 12, 14, 16, & 18 in consecutive order and read out of time slot interchanger memories 12, 14, 16, & 18 in random order to achieve the time slot interchange function.

The invention employs quad memory banks, comprising first time slot interchanger memory 12, second time slot interchanger memory 14, third time slot interchanger memory 16, and fourth time slot interchanger memory 18 in this embodiment. The use of quad memory banks reduces the speed requirements for the time slot interchanger memories 12, 14, 16, & 18. While data is being received from the subscribers, four copies may be made, one in each memory bank. Thus, all subscriber data may be made equally available from each of first time slot interchanger memory 12, second time slot interchanger memory 14, third time slot interchanger memory 16, and fourth time slot interchanger memory 18. Each time slot interchanger memory 12, 14, 16, & 18 is associated with its own source pointer RAM 36. The structure of the source pointers used to achieve the time slot interchange function for time slot interchanger 10 will be discussed more fully below.

Some of the signals received from the subscriber interface and written into time slot interchanger memories 12, 14, 16, & 18 are ISDN D-channel signals. ISDN D-channel signals are output by time slot interchanger memories 12, 14, 16, & 18 and received by shifters 20, 22, 24, & 26, respectively. Shifters 20, 22, 24, & 26 may be used to multiplex between one and four D-channel signals into a multiplexed DS0 signal. Multiplexer 28 feeds either the output of first time slot interchanger memory 12 or shifters 20, 22, 24, & 26 to interface 30. Interface 30 then sends the appropriate signal at the appropriate time to the central office switch. The invention accomplishes the multiplexing of ¼ DS0 signals by essentially simultaneously reading a D-channel signal from each of the time slot interchanger memories 12, 14, 16, & 18 and producing an assembled DS0 at the output of shifters 20, 22, 24, & 26 during that time slot. For example, if four D-channel signals were to be multiplexed into a single DS0 signal, one would be retrieved from each of the time slot interchanger memories 12, 14, 16, & 18 during the time slot in question. Thus, time slot interchanger 10 can multiplex D-channel signals into a DS0 signal and pass that signal to interface 30 or send a normal DS0 signal from first time slot interchanger memory 12 to interface 30 during a time slot.

Time slot interchanger 10 also includes control circuitry which controls the time slot interchanger memories 12, 14, 16, & 18, the shifters 20, 22, 24, & 26, and multiplexer 28. The control circuitry includes microcontroller and timing circuitry 32, multiplexer 34, source pointer RAMs 36, multiplexer 38, sequential address counters 40, and control circuitry 42.

Microcontroller and timing circuitry 32 oversees the control and timing of time slot interchanger 10. Microcontroller and timing circuitry 32 controls the interchange of time slots utilizing source pointers stored in the appropriate location in source pointer RAMs 36. Multiplexer 34 provides an address to source pointer RAMs 36 either from microcontroller and timing circuitry 32, or from sequential address counters 40. In this embodiment, multiplexer 34 is a quad multiplexer that handles multiplexing for all four source pointer RAMs 36. Alternatively, separate multiplexers 34 could be used without departing from the invention. Source pointer RAMs 36 receive their address inputs from microcontroller and timing circuitry 32 when the digital communications terminal is setting up a connection for a particular time slot. Microcontroller and timing circuitry 32 stores the appropriate pointer in one of the source pointer RAMs 36. During the operation of time slot interchanger 10, source pointer RAMs 36 receive their address inputs from sequential address counters 40.

First time slot interchanger memory 12, second time slot interchanger memory 14, third time slot interchanger memory 16, and fourth time slot interchanger memory 18 receive their address inputs from multiplexer 38. As was the case with multiplexer 34, multiplexer 38 is a quad multiplexer that multiplexes different address lines for the four time slot interchanger memories 12, 14, 16, & 18. Alternatively, a separate multiplexer 38 could be used for each of the time slot interchanger memories 12, 14, 16, & 18. Multiplexer 38 provides either the output of sequential address counters 40 or source pointer RAMs 36 as the address input to the time slot interchanger memories 12, 14, 16, & 18. The address for first time slot interchanger memory 12 is received from one of the source pointer RAMs 36 while the address for the other time slot interchanger memories 14, 16, & 18 are received from other source pointer RAMs 36. Alternatively, a lesser or greater number of source pointer RAMs 36 could be used without departing from the scope of the invention. Because time slot interchanger 10 comprises a consecutive write/random read time slot interchanger, first time slot interchanger memory 12, second time slot interchanger memory 14, third time slot interchanger memory 16, and fourth time slot interchanger memory 18 receive their address inputs from sequential address counters 40 while data is being written to the time slot interchanger memories 12, 14, 16, & 18 and receive their address inputs from source pointer RAMs 36 when data is being read from the time slot interchanger memories 12, 14, 16, & 18.

Control circuitry 42 determines whether the output of first time slot interchanger memory 12 or shifters 20, 22, 24, & 26 are passed to interface 30 through multiplexer 28. As will be more fully described below, control circuitry 42 also provides the appropriate control signals to shifters 20, 22, 24, & 26 to allow assembly of D-channel signals.

In operation, a digital communications terminal receives a frame of communication signals wherein some of the communication signals represent ISDN D-channel signals. The frame of communication signals is stored in the time slot interchanger memories 12, 14, 16, & 18 during a first frame period. A copy of the frame of communications signals is stored in each memory. The time slot interchanger memories 12, 14, 16, & 18 receive the frame through a subscriber interface 50. During a second frame period, at least some of the stored communication signals are retrieved from first time slot interchanger memory 12, second time slot interchanger memory 14, third time slot interchanger memory 16, and/or fourth time slot interchanger memory 18. In this embodiment, ordinary DS0 signals to be sent to the central office are retrieved during the proper time slot of the second frame and sent directly from first time slot interchanger memory 12 to interface 30 through multiplexer 28. Multiplexer 28 will pass the output of first time slot interchanger memory 12 to interface 30 when the particular time slot in question is to contain an ordinary DS0 signal.

To assemble up to four D-channel signals into a single DS0 in accordance with the invention, first time slot interchanger memory 12, second time slot interchanger memory 14, third time slot interchanger memory 16, and fourth time slot interchanger memory 18 may each be read once during a single time slot. Shifters 20, 22, 24, & 26 are used to assemble multiplexed DS0 signals using the communications signal data read out during these memory accesses. At the end of the time slot, interface 30 receives the outputs of shifters, 20, 22, 24, & 26 after those outputs have passed through multiplexer 28. Interface 30 may latch the data in or pass it through to other circuitry. Multiplexer 28 will pass the output of shifters 20, 22, 24, & 26 to interface 30 when the time slot in question contains a multiplexed D-channel signal. Interface 30 may then send the data in either serial or parallel form to a central office interface or to the central office itself. Collectively, shifters 20, 22, 24, & 26 comprise a D-channel assembler.

In this embodiment, each time slot in a frame for time slot interchanger 10 is associated with four source pointers stored in source pointer RAMs 36. One source pointer per time slot may be stored in each source pointer RAM 36. Each source pointer in this embodiment is 15 bits wide. Thus, source pointer RAMs 36 each comprise a 2K by 15 memory.

Each source pointer comprises a series of address bits indicating the source address—11 bits in this example for a 2K by 2K time slot interchanger. The source pointer further comprises D-channel source bits (three bits in this embodiment) indicating which bit pair within a byte containing a D-channel signal contains the D-channel information. In other words, the invention allows the D-channel information to be placed in bits 0:1, 1:2, 2:3, 3:4, 4:5, 5:6, 6:7, or 7:0 of the DS0 signal received from a subscriber. This feature of the invention allows flexibility in designing interface circuitry for subscribers. The source pointer in this embodiment also includes a control bit indicating whether a particular byte to be read is a DS0 or a D-channel signal. This control bit may be used to control multiplexer 28. Other bits could be included or some of the described bits omitted from the source pointer without departing from the scope of the invention.

For ordinary DS0s, time slot interchanger 10 may simply cause first time slot interchanger memory 12 to be read during a particular time slot while ignoring the output of second time slot interchanger memory 14, third time slot interchanger memory 16, and fourth time slot interchanger memory 18. The data from first time slot interchanger memory 12 may be transferred to interface 30 through multiplexer 28 at the end of the time slot. If the speed of the circuitry of interface 30 becomes a problem, then multiplexer 28 could latch the appropriate data at the end of a time slot.

For D-channel signals, the D-channel source bits of the source pointer specify the pair of consecutive bits (potentially including bit pair 7 and 0) where the D-channel information is located for a particular location. Time slot interchanger 10 causes the full 8 bits to be read from that memory location in the time slot interchanger memory 12, 14, 16, or 18 corresponding to the source pointer RAM 36 from which the source pointer was retrieved. The retrieved 8 bits are then sent to the corresponding shifter 20, 22, 24, or 26. Alternatively, control circuitry could be designed to cause only the relevant 2 bits to be read from the time slot interchanger memories 12, 14, 16, & 18 at the appropriate time.

Shifters 20, 22, 24, & 26 may be used to create a multiplexed DS0 signal. Other circuitry could also be used to assemble up to 4 D-channel signals into a multiplexed DS0 signal without departing from the scope of the invention. Shifters 20, 22, 24, & 26 shift the selected bits indicated by the D-channel source pointer bits to the 2-bit output of the shifters 20, 22, 24, & 26. Shifters 20, 22, 24, & 26 are capable of shifting any pair of consecutive bits (potentially including bit pairs 7 and 0) to the output of the shifter 20, 22, 24, & 26 based upon control signals it receives.

After the appropriate bits have been shifted to the output of shifters 20, 22, 24, & 26, the assembled DS0 signal may be passed through multiplexer 28 to interface 30. The assembled DS0 signal could be latched in interface 30, multiplexer 28 or in the outputs of shifters 20, 22, 24, & 26.

First time slot interchanger memory 12, second time slot interchanger memory 14, third time slot interchanger memory 16 and fourth time slot interchanger memory 18 could each be divided into a section for odd frames and a section for even frames as is commonly known in the art. This technique could be used with any of the embodiments discussed herein.

Focusing now on the processing of an entire frame, a frame of communication signals received from a subscriber interface is stored consecutively in time slot interchanger memories 12, 14, 16, & 18. During a second frame period, these communication signals are read out of time slot interchanger memories 12, 14, 16, & 18 in a random order in order to achieve an interchange of those signals. For a given time slot in the frame that is sent to the central office, interface 30 will either receive an ordinary DS0 signal or a multiplexed signal comprising a plurality of multiplexed ISDN D-channel signals. Interface 30 receives the appropriate signals in the order dictated by the source pointers stored in source pointer RAMs 36.

FIG. 2 illustrates a second embodiment of a time slot interchanger 10 that may be used in a digital communications terminal to multiplex ISDN D-channel signals into multiplexed signals in accordance with the invention. Time slot interchanger 10 of FIG. 2 differs from the embodiment illustrated in FIG. 1 in that the output of first time slot interchanger memory 12 is only connected to first shifter 20, while multiplexer 28 is omitted. Ordinary DS0 signals also pass through shifters 20, 22, 24, & 26. The differences between the embodiment of time slot interchanger 10 of FIG. 2 and the embodiment of FIG. 1 can best be understood by examining the operation of the embodiment illustrated in FIG. 2.

In the embodiment illustrated in FIG. 2, D-channel assembly takes place in the same manner as described for the embodiment illustrated in FIG. 1. Here, however, multiplexer 28 has been eliminated and the output of shifters 20, 22, 24, & 26 are always sent to interface 22 at the end of a time slot. Ordinary DS0 signals are handled differently than in the embodiment illustrated in FIG. 1. In this embodiment, each DS0 is treated similarly to multiplexed D-channel signals. In order to send a DS0 to the central office in a particular time slot, that DS0 should be sent to interface 30 at the appropriate time. To accomplish this, the memory location in each of the time slot interchanger memories 12, 14, 16, & 18 that contains the DS0 received from the subscriber interface is read simultaneously from each memory during the appropriate time slot. In other words, each time slot interchanger memory 12, 14, 16, & 18 supplies 2 of the 8 bits that are sent to interface 30 during each time slot.

By building a DS0 2 bits at a time in this embodiment, a bit can be eliminated from each source pointer and the control circuitry simplified. The bit indicating whether the source pointer is for a DS0 or D-channel signal is unnecessary with this embodiment. This simplification is achieved because ordinary DS0s are treated similarly to D-channel signals. Four source pointers may be used to access an ordinary DS0 in the time slot interchanger memories 12, 14, 16, & 18.

FIG. 3 illustrates a third embodiment of a time slot interchanger 10 that may be used in a digital communications terminal to multiplex ISDN D-channel signals into multiplexed signals in accordance with the invention. Time slot interchanger 10 of FIG. 3 differs from the embodiments illustrated FIGS. 1 and 2 in that the output of time slot interchanger memories 12, 14, 16, & 18 are connected directly to interface 30. Shifters 20, 22, 24, & 26 and multiplexer 28 have been omitted. The differences between the embodiment of time slot interchanger 10 of FIG. 3 and the embodiments of FIGS. 1 and 2 can best be understood by examining the operation of the embodiment illustrated in FIG. 3.

In the embodiment illustrated in FIG. 3, D-channel assembly takes place in a similar manner as described for the embodiment illustrated in FIG. 1. Here, however, multiplexer 28 and shifters 20, 22, 24, & 26 have been omitted and the output of time slot interchanger memories 12, 14, 16, & 18 are always sent to interface 30 at the end of a time slot. Also, like the embodiment illustrated in FIG. 2, each DS0 is treated similarly to a multiplexed D-channel signal. In order to send a DS0 to the central office in a particular time slot, that DS0 should be sent to interface 30 at the appropriate time. In this embodiment, for each 8-bit signal received from the subscriber interface, 2-bits are stored in each of first time slot interchanger memory 12, second time slot interchanger memory 14, third time slot interchanger memory 16 and fourth time slot interchanger memory 18. Each of the time slot interchanger memories in this embodiment is a 2K by 2 memory. Bits 0 and 1 are stored in fourth time slot interchanger memory 18, bits 2 and 3 in third time slot interchanger memory 16, bits 4 and 5 in second time slot interchanger memory 14, and bits 6 and 7 in first time slot interchanger memory 12.

When a frame is being sent to interface 30, DS0 and multiplexed D-Channel signals are treated similarly. For DS0 signals, the same address in each memory bank is accessed essentially simultaneously. Two bits of the DS0 are output by each memory bank. For D-Channel signals, up to four D-Channel signals may be essentially simultaneously accessed by supplying up to four distinct addresses to the four memory banks. A different D-Channel signal, already in proper position, as discussed below, may be essentially simultaneously retrieved from each memory bank.

Shifters 20, 22, 24, & 26 may be omitted in this embodiment because the D-channel signals do not need any shifting. To achieve both proper D-channel assembly and proper handling of DS0 signals in this embodiment, the D-channel signals are placed in the proper 2-bit position for output to interface 30 before they are even received by time slot interchanger 10. For example, the D-channel signals may be placed in the proper 2-bit position by ISDN and line cards or by the subscriber interface of the digital communications terminal. The "proper 2-bit position" refers to the position of the D-channel signal after it has passed through time slot interchanger 10 and has been placed in a multiplexed DS0 signal for transmission to the central office through interface 30. Line cards may be made programmable such that any ISDN D-channel signal can be placed into bits 0:1, 2:3, 4:5 or 6:7 of a DS0 for transport to the digital communications terminal. At time slot interchanger 10, a register may still be used to assemble four D-channels into a DS0 signal, but because the D-channel signals are already in proper position within the byte, shifters 20, 22, 24, & 26 may be omitted in this embodiment of time slot interchanger 10. The source pointer for this embodiment may omit the D-channel source bits as the D-channel data bits already are in proper position for transmission to the central office when received by time slot interchanger memories 12, 14, 16, & 18. It should be noted that interface 30 could also latch the outputs of time slot interchanger memories 12, 14, 16, & 18 without departing from the scope of the invention.

By treating DS0s and multiplexed D-channel signals similarly, a bit can be eliminated from each source pointer and the control circuitry simplified. The bit indicating whether the source pointer is for a DS0 or a D-channel signal is unnecessary with this embodiment. This simplification is achieved because ordinary DS0s are treated similarly to D-channel signals. Four source pointers, one for each time slot interchanger memory 12, 14, 16, & 18 with the same address should be used to access an ordinary DS0 in this embodiment.

It should be understood that the term "control circuitry" is a broad term referring simply to circuitry used to control other circuitry. The term is broadly intended to include the direct use of bits from source pointer RAMs 36 to control time slot interchanger 10. The term, "latching" in this application is also used broadly to refer to the act of storing data for a period of time. The term refers to capturing of data whether components actually latch data using a latching function, latch data using a flip flop type function, or latch data in some other manner.

One embodiment of the invention involves storing data bits of ISDN D-channel signals in time slot interchanger memories 12, 14, 16, & 18 in the same position that those signals will occupy within one of the multiplexed signals. The term "same position" refers to the position of data bits within time slot interchanger memories 12, 14, 16, & 18 relative to other data bits. Time slot interchanger memories 12, 14, 16 and/or 18 could also include other bits such as error detection/correction bits without departing from the scope of the invention. The data bits of a D-channel signal could be placed in all four 2-bit positions in a DS0 signal before being sent to time slot interchanger 10 through the subscriber interface. This alternative might simplify the implementation of time slot interchanger 10.

Although the invention is illustrated in the context of assembling D-channel signals from subscribers destined for a central office, the invention could be used at any point in a telecommunications system. For example, assembly could occur within a class V central office switch itself.

Although the present invention has been described in detail, it should be understood that various changes, substitutions, and alterations can be made hereto without departing from the spirit and scope of the invention as defined by the appended claims.

What is claimed is:

1. A time slot interchanger, comprising:
   a first interface operable to receive a first frame of communication signals, wherein some of the communication signals represent ISDN D-channel signals, each ISDN D-channel signal represented by a first number of data bits and a second number of other bits;
   a first memory coupled to the first interface and operable to store the first frame of communication signals during a first frame period;
   a second memory coupled to the first interface and operable to store the first frame of communication signals during the first frame period;
   a third memory coupled to the first interface and operable to store the first frame of communication signals during a first frame period;
   a fourth memory coupled to the first interface and operable to store the first frame of communication signals during the first frame period;

control circuitry coupled to the first, second, third, and fourth memories and operable to cause the memories to output at least some of the stored communication signals during a second frame period; and a second interface coupled to the first, second, third, and fourth memories and operable to transmit a second frame of communication signals, the second frame of communication signals including multiplexed signals, the multiplexed signals including an output formed by combining the data bits of ISDN D-channel signals output from at least two of the first, second, third, and fourth memories, the multiplexed signals including an output from only the first memory.

2. A time slot interchanger, comprising:

a first interface operable to receive a first frame of communication signals, wherein some of the communication signals represent ISDN D-channel signals, each ISDN D-channel signal represented by a first number of data bits and a second number of other bits;

a first memory coupled to the first interface and operable to store the first frame of communication signals during a first frame period;

a second memory coupled to the first interface and operable to store the first frame of communication signals during the first frame period;

a third memory coupled to the first interface and operable to store the first frame of communication signals during a first frame period;

a fourth memory coupled to the first interface and operable to store the first frame of communication signals during the first frame period;

control circuitry coupled to the first, second, third, and fourth memories and operable to cause the memories to output at least some of the stored communication signals during a second frame period; and a second interface coupled to the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories;

a first shifter comprising a first input and a first output, the first input coupled to the output of the first memory, the first output coupled to the second interface, the first shifter controlled by the control circuitry and operable to receive a first output communication signal from the first memory and produce the first output comprising two selected bits of the first output communication signal, wherein the two selected bits are selected in response to one or more bits of a source pointer associated with the memory location in the first memory from which the first output communication signal was output;

a second shifter comprising a second input and a second output, the second input coupled to the output of the second memory, the second output coupled to the second interface, the second shifter controlled by the control circuitry and operable to receive a second output communication signal from the second memory and produce the second output comprising two selected bits of the second output communication signal, wherein the two selected bits are selected in response to one or more bits of a source pointer associated with the memory location in the second memory from which the second output communication signal was output;

a third shifter comprising a third input and a third output, the third input coupled to the output of the third memory, the third output coupled to the second interface, the third shifter controlled by the control circuitry and operable to receive a third output communication signal from the third memory and produce the third output comprising two selected bits of the third output communication signal, wherein the two selected bits are selected in response to one or more bits of a source pointer associated with the memory location in the third memory from which the third output communication signal was output;

a fourth shifter comprising a fourth input and a fourth output, the fourth input coupled to the output of the fourth memory, the fourth output coupled to the second interface, the fourth shifter controlled by the control circuitry and operable to receive a fourth output communication signal from the fourth memory and produce the fourth output comprising two selected bits of the fourth output communication signal, wherein the two selected bits are selected in response to one or more bits of a source pointer associated with the memory location in the fourth memory from which the fourth output communication signal was output; and wherein the multiplexed signals are formed by combining the data bits of ISDN D-channel signals output from at least two of the first, second, third, and fourth outputs.

3. The time slot interchanger of claim 2, further comprising:

a multiplexer having a first mux input, a second mux input, and a mux output and controlled by the control circuitry, the first mux input coupled to the first memory, the second mux input coupled to an eight bit combination comprising the first, second, third, and fourth outputs, and the mux output coupled to the second interface, the multiplexer operable to select the first input or second input in response to one or more bits of a source pointer.

4. The time slot interchanger of claim 2, wherein the second frame of communication signals includes DS0 signals, the DS0 signals comprising an eight bit combination comprising the first, second, third, and fourth outputs.

5. The time slot interchanger of claim 1, wherein the first number of data bits of each communication signal received by the first interface that represent an ISDN D-channel signal are positioned within the first, second, third, and fourth memories such that those bits will occupy the same position within one of the multiplexed signals.

6. The time slot interchanger of claim 1 wherein the second frame of communication signals is transmitted during the second frame period.

7. A digital communications terminal, comprising:

a plurality of subscriber links;

a central office link;

a time slot interchanger, including:

a first time slot interchanger interface coupled to the plurality of subscriber links and operable to receive a first frame of communication signals, wherein some of the communication signals represent ISDN D-channel signals, each ISDN D-channel signal represented by a first number of data bits and a second number of other bits;

a first memory coupled to the first time slot interchanger interface and operable to store the first frame of communication signals during a first frame period;

a second memory coupled to the first time slot interchanger interface and operable to store the first frame of communication signals during the first frame period;

a third memory coupled to the first time slot interchanger interface and operable to store the first frame of communication signals during a first frame period;

a fourth memory coupled to the first time slot interchanger interface and operable to store the first frame of communication signals during the first frame period;

control circuitry coupled to the first, second, third, and fourth memories and operable to cause the memories to output at least some of the stored communication signals during a second frame period; and a second time slot interchanger interface coupled to the central office link and the first, second, third, and fourth memories and operable to transmit a second frame of communication signals, the second frame of communication signals including multiplexed signals, the multiplexed signals including an output formed by combining the data bits of ISDN D-channel signals output from at least two of the first, second, third, and fourth memories, the multiplexed signals including an output from only the first memory.

8. A digital communications terminal, comprising:

a time slot interchanger, including:

a first time slot interchanger interface operable to receive a first frame of communication signals, wherein some of the communication signals represent ISDN D-channel signals, each ISDN D-channel signal represented by a first number of data bits and a second number of other bits;

a first memory coupled to the first time slot interchanger interface and operable to store the first frame of communication signals during a first frame period;

a second memory coupled to the first time slot interchanger interface and operable to store the first frame of communication signals during the first frame period;

a third memory coupled to the first time slot interchanger interface and operable to store the first frame of communication signals during a first frame period;

a fourth memory coupled to the first time slot interchanger interface and operable to store the first frame of communication signals during the first frame period;

control circuitry coupled to the first, second, third, and fourth memories and operable to cause the memories to output at least some of the stored communication signals during a second frame period; and a second time slot interchanger interface coupled to the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories;

a first shifter comprising a first input and a first output, the first input coupled to the output of the first memory, the first output coupled to the second time slot interchanger interface, the first shifter controlled by the control circuitry and operable to receive a first output communication signal from the first memory and produce the first output comprising two selected bits of the first output communication signal, wherein the two selected bits are selected in response to one or more bits of a source pointer associated with the memory location in the first memory from which the first output communication signal was output;

a second shifter comprising a second input and a second output, the second input coupled to the output of the second memory, the second output coupled to the second time slot interchanger interface, the second shifter controlled by the control circuitry and operable to receive a second output communication signal from the second memory and produce the second output comprising two selected bits of the second output communication signal, wherein the two selected bits are selected in response to one or more bits of a source pointer associated with the memory location in the second memory from which the second output communication signal was output;

a third shifter comprising a third input and a third output, the third input coupled to the output of the third memory, the third output coupled to the second time slot interchanger interface, the third shifter controlled by the control circuitry and operable to receive a third output communication signal from the third memory and produce the third output comprising two selected bits of the third output communication signal, wherein the two selected bits are selected in response to one or more bits of a source pointer associated with the memory location in the third memory from which the third output communication signal was output;

a fourth shifter comprising a fourth input and a fourth output, the fourth input coupled to the output of the fourth memory, the fourth output coupled to the second time slot interchanger interface, the fourth shifter controlled by the control circuitry and operable to receive a fourth output communication signal from the fourth memory and produce the fourth output comprising two selected bits of the fourth output communication signal, wherein the two selected bits are selected in response to one or more bits of a source pointer associated with the memory location in the fourth memory from which the fourth output communication signal was output; and wherein the multiplexed signals are formed by combining the data bits of ISDN D-channel signals output from at least two of the first, second, third, and fourth outputs.

9. The time slot interchanger of claim 8, further comprising:

a multiplexer having a first mux input, a second mux input, and a mux output and controlled by the control circuitry, the first mux input coupled to the first memory, the second mux input coupled to an eight bit combination comprising the first, second, third, and fourth outputs, and the mux output coupled to the second time slot interchanger interface, the multiplexer operable to select the first input or second input in response to one or more bits of a source pointer.

10. The time slot interchanger of claim 8, wherein the second frame of communication signals includes DS0 signals, the DS0 signals comprising an eight bit combination comprising the first, second, third, and fourth outputs.

11. A method for multiplexing ISDN D-channel signals into multiplexed signals, comprising:

receiving a frame of communication signals, wherein some of the communication signals represent ISDN-D-channel signals, each ISDN D-channel signal represented by a first number of data bits and a second number of other bits;

storing a first copy of the frame of communication signals in a first memory during a first frame period;

storing a second copy of the frame of communication signals in a second memory during the first frame period;

storing a third copy of the frame of communication signals in a third memory during the first frame period;

storing a fourth copy of the frame of communication signals in a fourth memory during the first frame period;

retrieving at least some of the stored communication signals from the first, second, third, and fourth memories during a second frame period; and assembling multiplexed signals, at least one multiplexed signal including a multiplexed combination of the data bits of ISDN D-channel signals retrieved from at least two of the first, second, third and fourth memories, at least one multiplexed signal including an output from only the first memory.

12. A method for multiplexing ISDN D-channel signals into multiplexed signals, comprising:

receiving a frame of communication signals, wherein some of the communication signals represent ISDN-D-channel signals, each ISDN D-channel signal represented by a first number of data bits and a second number of other bits;

storing a first copy of the frame of communication signals in a first memory during a first frame period;

storing a second copy of the frame of communication signals in a second memory during the first frame period;

storing a third copy of the frame of communication signals in a third memory during the first frame period;

storing a fourth copy of the frame of communication signals in a fourth memory during the first frame period;

retrieving at least some of the stored communication signals from the first, second, third, and fourth memories during a second frame period; and assembling multiplexed signals, at least one multiplexed signal comprising a multiplexed combination of the data bits of ISDN D-channel signals retrieved from at least two of the first, second, third and fourth memories, wherein each of the first, second, third and fourth memories are connected to a corresponding first, second, third and fourth shifter;

the first shifter comprising a first input and a first output, the first input coupled to the output of the first memory, the first shifter controlled by the control circuitry and operable to receive a first output communication signal from the first memory and produce the first output comprising two selected bits of the first output communication signal, wherein the two selected bits are selected in response to one or more bits of a source pointer associated with the memory location in the first memory from which the first output communication signal was output;

the second shifter comprising a second input and a second output, the second input coupled to the output of the second memory, the second shifter controlled by the control circuitry and operable to receive a second output communication signal from the second memory and produce the second output comprising two selected bits of the second output communication signal, wherein the two selected bits are selected in response to one or more bits of a source pointer associated with the memory location in the second memory from which the second output communication signal was output;

the third shifter comprising a third input and a third output, the third input coupled to the output of the third memory, the third shifter controlled by the control circuitry and operable to receive a third output communication signal from the third memory and produce the third output comprising two selected bits of the third output communication signal, wherein the two selected bits are selected in response to one or more bits of a source pointer associated with the memory location in the third memory from which the third output communication signal was output;

the fourth shifter comprising a fourth input and a fourth output, the fourth input coupled to the output of the fourth memory, the fourth shifter controlled by the control circuitry and operable to receive a fourth output communication signal from the fourth memory and produce the fourth output comprising two selected bits of the fourth output communication signal, wherein the two selected bits are selected in response to one or more bits of a source pointer associated with the memory location in the fourth memory from which the fourth output communication signal was output; and wherein the multiplexed signals are formed by combining the data bits of ISDN D-channel signals output from at least two of the first, second, third, and fourth outputs.

13. The method of claim 12, further comprising:

multiplexing either the output of the first memory or an eight bit combination comprising the first, second, third, and fourth outputs, in response to a source pointer to produce a selected output.

14. The method of claim 11, further comprising:

assembling DS0 signals, each DS0 signal assembled by retrieving a DS0-type communication signal from each of the first, second, third, and fourth memories and combining four pairs of bits, one pair of bits selected from each of the DS0-type communication signals retrieved from the memories.

15. The method of claim 11, wherein the assembly of a multiplexed signal takes place during a single time slot of a frame period.

* * * * *